United States Patent

Houston, Jr. et al.

[15] 3,679,765
[45] July 25, 1972

[54] REMOVAL OF POLYMER FROM CRACKED GAS CAUSTIC WASHES OR CAUSTIC SOLUTIONS

[72] Inventors: William L. Houston, Jr.; William C. Clark, both of Sweeny, Tex.

[73] Assignee: Phillips Petroleum Company

[22] Filed: Oct. 29, 1969

[21] Appl. No.: 872,309

[52] U.S. Cl..................260/683 R, 208/255, 260/677 A
[51] Int. Cl..........................................C07c 3/00
[58] Field of Search............260/683 R, 677 A, 679 A, 677; 208/255 A, 235, 284 S, 259, 255, 284, 289; 210/232

[56] References Cited

UNITED STATES PATENTS

| | | | |
|---|---|---|---|
| 3,534,117 | 10/1970 | Clark | 260/681.5 |
| 2,794,767 | 6/1957 | Gleim et al. | 208/235 |
| 2,986,514 | 5/1961 | Akers et al. | 208/284 |
| 2,740,749 | 4/1956 | Megueriam et al. | 208/235 |
| 1,866,417 | 7/1932 | Mackert | 210/32 |
| 2,121,323 | 6/1938 | Manley et al. | 208/255 |

FOREIGN PATENTS OR APPLICATIONS

| | | | |
|---|---|---|---|
| 1,021,346 | 2/1963 | Great Britain | 208/289 |
| 513,105 | 10/1939 | Great Britain | 208/259 |

Primary Examiner—Delbert E. Gantz
Assistant Examiner—J. Nelson
Attorney—Young and Quigg

[57] ABSTRACT

A cracked hydrocarbon gas, e.g., an effluent resulting from the pyrolytic conversion of a feed consisting essentially of ethane to form ethylene, is treated conventionally to produce a stream containing essentially ethylene which is treated with an alkali wash. The used alkali containing solid and other polymer formed therein and polymer-forming constituents is periodically or continuously treated by contacting the same with a solvent, e.g., an aromatic, to remove said polymers and polymer forming constituents. The used solvent is treated by contact with an adsorbent, e.g., activated charcoal or carbon or functional equivalent, to remove from the solvent polymer and polymer-forming constituents, rendering the solvent suitable for reuse and avoiding ultimate plugging of pumps, pipes, heat exchangers and other equipment. Polymers removed from the alkali wash can be liquid but usually are substantially solid and are at least to a real extent insoluble in the alkali wash. Polymer-forming constituents usually will not be entirely dissolved in the alkali wash. By use of the adsorbent to remove polymer-formers, and polymers, the formation of polymers in the alkali wash is considerably reduced if not completely avoided.

The treatment of the alkali wash and the solvent considerably reduces the growth of polymer initially, the treatment of solvent with the charcoal considerably reducing the tendency of polymer-forming constituents to form polymer by simply removing the polymer-forming constituents.

5 Claims, 1 Drawing Figure

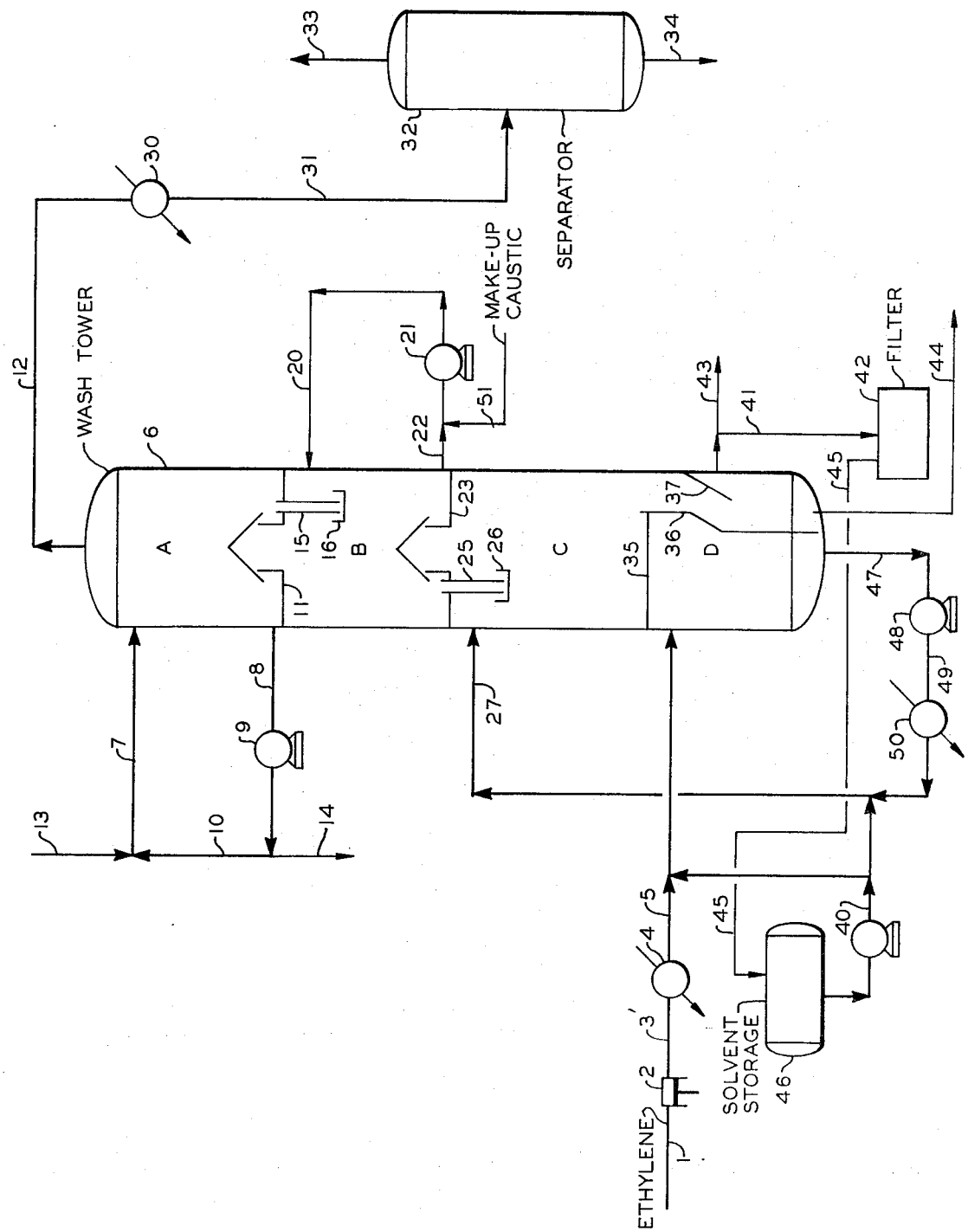

REMOVAL OF POLYMER FROM CRACKED GAS CAUSTIC WASHES OR CAUSTIC SOLUTIONS

This invention relates to the production of a treated hydrocarbon gas. In one of its aspects it relates to the treatment of a hydrocarbon gas with an alkaline or caustic solution, e.g., an ethylene gas containing stream obtained by pyrolysis of a hydrocarbon such as ethane or propane and to the treatment of the thus used solution. In a further aspect of the invention it relates to the removal of polymers and/or polymer-forming constituents from a caustic solution used to treat a stream of gas containing such constituents.

In one of its concepts the invention provides a method wherein a gas containing stream, e.g., an ethylene gas stream, being processed to prepare high purity ethylene is washed with an alkali caustic solution by contacting the same and the gas in a contacting zone adapted to cause intimate admixture of the gas and the solution in a manner to take into the body of the wash solution, although not necessarily dissolving the same, any polymer-forming material carried by the gas resulting in the accumulation in the wash solution of polymeric material, usually a solid kernel-like material for the most part of it, and other polymer-forming constituents and the solution containing said material or constituents is treated either intermittently or continuously with a solvent or preferential carrier for said polymer and polymer-forming constituents, the solvent being, for example, a saturated liquid hydrocarbon or an aromatic liquid hydrocarbon, the latter now being preferred.

In another of its concepts the invention provides for a further treatment of the used wash solution to better prepare it for reuse as may be desired by contacting the same with a material which will remove therefrom the said polymeric material and/or polymer-forming constituents, for example, activated charcoal.

It has been found in the caustic wash treatment of a gas stream containing a fair amount of ethylene, say, at least about 50 percent and usually about 80 percent, derived from the pyrolysis of ethane and, therefore, unavoidably containing some unsaturated hydrocarbons, e.g., butene, butadiene, etc., that the caustic solution in the treatment, as in the wash column, exhibits the formation of polymer therein resulting in plugging pumps and related equipment. Manifestly, it is not a good solution to continually use strainers which must be continually cleaned. The strainers will get plugged which cause operational problems.

We have now conceived as a solution to the problem which has been encountered that the periodic or continuous treatment of the wash solution with a solvent, as herein described, will considerably remove polymers from the wash solution. Further, we have conceived or found that treatment of the used solvent with an adsorbent, e.g., activated charcoal to remove the polymer, indeed, polymer-forming constituents from the used solvent considerably cuts down the initial polymer formation and the amount of total polymer formed as well as the amount of wash solution needed over a period of time. Thus, we have found that the charcoal selectively adsorbs from the solvent, not only the solid or semi-solid polymeric material, as the case may be, but importantly also, the polymer-forming constituents.

An object of this invention is to provide a method for treating a caustic or alkaline wash which has been used to treat a hydrocarbon gas. Another object of the invention is to extend the useful life of such a wash. A further object of the invention is to provide a method for the removal of polymer and/or polymer-forming constituents from a used caustic wash as herein described. A still further object is to avoid deposition and/or plugging of equipment by polymeric materials. A further object still is to remove from a solvent polymeric and/or polymer-forming constituents contained therein.

Other aspects, concepts, objects and the several advantages of the invention are apparent from this disclosure, the drawing and the appended claims.

According to the present invention there is provided a method for treating a used aqueous alkali wash liquid such as aqueous NaOH containing solid polymers and polymer-forming constituents resulting in said liquid when used to wash a gas effluent resulting from the pyrolytic conversion of a normally gaseous hydrocarbon to form a gaseous unsaturated hydrocarbon which comprises intimately contacting said used liquid with a solvent which will remove therefrom said solid polymer and said polymer-forming constituents so that upon reuse of said liquid formation of additional polymer therein by said polymer-forming constituents will be avoided thus to avoid plugging of pumps, pipes, etc.

Also, according to the present invention there is provided a method as stated herein wherein the used solvent containing polymer and polymer-forming constituents is contacted with a treating agent to remove from said used solvent polymer and polymer-forming constituents so that the formation of additional polymer in the wash operation by said polymer-forming constituents upon reuse of said wash fluid and/or said solvent will be avoided.

A now preferred solvent is an aromatic, e.g., benzene, toluene, xylene, mixed xylenes, pyrolysis gasoline, methanol, etc.

A now preferred treating agent to treat the solvent is activated charcoal, activated carbon, or other known filtering agent.

The dry polymer, upon removal from the spent caustic taken from the caustic wash column in an ethylene gas treating unit looked like a mixture of fine granules with varying crumb sizes up to about one-fourth inch. The granules tend to grow to the larger sizes over a period of time.

The invention is practiced by injecting into the wash column or other treating zone separately or together with the ethylene containing gas stream a relatively small amount of the selected solvent, say, benzene or toluene. A tower, as herein described, can be "depolymered" simply by injecting it periodically, say, twice a week, with an amount of solvent sufficient to reduce or eliminate the polymer therein. This polymer in the tower is in the caustic solution also in the tower. Thus, here and in the claims the removal of polymer and/or polymer-forming constituents from the caustic solution is inclusive of removal of these materials from the equipment containing the solution as well as from the solution per se, regardless of its instant location.

The materials removed are simply put polymers resulting from a gas resulting from a pyrolysis of a gaseous hydrocarbon such as ethane which due to its process of production and recovery is substantially pure. Such a feed, e.g., ethane, will have, usually, a composition approximated by the following:

| | |
|---|---|
| Hydrogen | 0.0 |
| Methane | 1.900 |
| Ethylene | 0.0 |
| Ethane | 96.500 |
| Acetylene | 0.0 |
| Propylene | 1.300 |
| Propane | 0.300 |
| Butene | 0.0 |
| Butadiene | 0.0 |
| N-butane | 0.0 |
| Sum | 100.000 |

It will be seen that the feed stream is substantially all hydrocarbon, there being contained in such a stream virtually no sulfur, for example. Indeed, the sulfur in such a stream is of the order of 1 part per million.

The injection of the tower can be accomplished also by pumping the solvent into the caustic wash circulation line. When there are two or more washes, e.g., a strong caustic wash (circa 10 percent NaOH concentration) and a weak caustic wash (circa 2.5 percent NaOH concentration), the solvent is usually injected into the weak or lowermost caustic wash, i.e., that with which the gas to be treated first comes into contact.

The solvent and polymer contained therein is usually less dense than the caustic wash. It is drawn off or decanted through an outlet above the pool or reservoir of wash liquid in the bottom of the wash zone.

It is within the scope of the invention to inject the solvent into more than one wash zone or into more than one place in each zone injected.

As stated, the gas treated usually results from pyrolysis of a hydrocarbon as in the production of ethylene. Thus, a feed, as above tabulated, when cracked at, say, 1,500°—1,550° F., and at approximately atmospheric pressure will yield a furnace effluent having the following approximation:

| | |
|---|---|
| Carbon Monoxide | 0.29 |
| Carbon Dioxide | 0.00 |
| Hydrogen | 28.83 |
| Methane | 10.38 |
| Acetylene | 0.28 |
| Ethylene | 34.34 |
| Ethane | 24.38 |
| Propylene | 0.65 |
| Propane | 0.23 |
| Butadienes | 0.23 |
| Butylenes | 0.23 |
| $C_3+$ & Oils | 0.16 |
| Sum | 100.00 |

It will be noted that there is present in the pyrolysis effluent butylenes and butadiene, unsaturated monomers which tend to form polymeric materials. The "oils", no doubt, also contain some unsaturated materials and can be expected to be and are, indeed, to an extent, aromatic in character being derived from a high temperature pyrolysis as one skilled in the art will recognize.

The pyrolyzed gas is cooled and water quenched, compressed, cooled, subjected to knock-out drum operation and then caustic treated as further described in connection with the drawing.

Referring now to the drawing, an ethylene stream 1, resulting from the pyrolysis of an ethane feed stream as herein described and which has been water quenched, compressed and passed through a knock-out zone is passed by compressor 2, by 3, cooler 4 and 5 into the lower portion of caustic wash tower 6. Caustic wash tower 6 is composed of essentially four sections, from top to bottoms, A, B, C, and D, respectively. A water wash to remove any caustic carryover, a strong caustic wash, a dilute caustic wash to remove polymer and polymer-forming constituents, and an oil and polymer from caustic wash separation sections are therein respectively practiced.

Water which contacts the gas is circulated by 7, 8, pump 9 and 10 into the top of the tower to an upper tray, collected at a lower doughnut-type tray 11 to wash the gases taken overhead at 12. Some water is added to the system, for example, steam condensate at 13. Also, some used water is removed to sewer at 14. A small portion of the water in section A may, but preferably does not, pass downwardly through downcomer pipe 15. However, enough water is overflowed into downcomer pipe 15 to insure a substantial gas or vapor seal at its foot by filling seal cup 16.

In section B of the tower the gas contacts a strong caustic solution (e.g., 10 percent) introduced at the upper portion of section B by 20 being pumped by pump 21 and recovered to the suction of pump 21 by 22 from doughnut tray 23 which delineates the bottom of section B.

At least sufficient solution overflows into downcomer 25 to fill seal cup 26.

In section C the gas contacts a dilute caustic solution (e.g., 2–3 percent) introduced by 27 to this section to the upper portion thereof above the entry of the gas feed to the tower.

Thus, the gas feed to the tower will be contacted and, therefore, treated with a dilute alkali and with a stronger alkali and finally with water before it leaves tower 6. The gas is then passed by 12 to a dehydrator cooler 30 and thence by 31 to a gas separator 32 for further recovery and treatment as by passing the same by 33 to further dehydration. Any water which condenses in separator 32 is removed to sewer by 34.

Returning now to tower 6, the rates of overflow into the downcomers 15 and 25 are precalculated to maintain desired levels on the trays 11 and 23, the sizes of the downcomers being determined to prevent undue amounts of liquid from passing from an upper section into a lower section.

At the bottom of section C, tray 35 coacts with a plate 36 to provide a gas-receiving section below tray 35. Plate 36 extends almost to but not completely to the bottom of the tower. A baffle element 37 is provided between the tower wall and plate 36. The combination of the plate 36 and baffle 37, which form no part of our invention and which have been disclosed to us by at least one other, permits an operation according to the present invention which, as earlier herein noted involves the use of the caustic washer to clean the gas. Polymers are formed in the washes and polymer-forming constituents from the gas are found therein. These are potentially polymerizable hydrocarbons, for example, lower molecular weight compounds. The completely formed polymers which tend to and do accumulate in the caustic wash appear to be a mixture of fine granules with crumbs of various sizes up to about one-fourth inch size as stated. This appearance of the granules is noted upon removing the same from the caustic wash as by washing with ample water.

According to the invention there is periodically or continuously introduced into the tower by 40 and 5 to treat the caustic, as with the feed gas, a quantity of a solvent (1 to 5 barrels per hour, up to 50 barrels) which will remove in the tower from the wash material polymer and polymer-forming constituents, the solvent, which now is preferred to be an aromatic solvent, which can be other than aromatic, for example, saturated compounds, e.g., a low boiling saturated hydrocarbon, such as isopentane.

The aromatic solvent now preferred is benzene. Related solvents such as toluene, xylene, etc., can also be used.

Still according to the invention the selected solvent or solvents used as a single material or as a blend of several materials, after separation of the caustic wash can be passed by 41 from the tower bottom portion to an activated charcoal filter 42 which removes entrained polymers and importantly, as a further feature of the invention the polymer-forming constituents from the solvent thus considerably lengthening the useful life of the solvent and of the caustic wash by avoiding in the first instance the formation of polymers.

As shown in the drawing solvent containing the polymer, either dissolved and/or entrained and the polymer-forming constituents is removed from the tower bottom from below the baffle 37 by valve pipe 43 and/or from just above the very bottom of the tower by pipe 44 which extends up into section D into a solvent phase. If the solvent phase containing the polymer and polymer formers is heavier than the wash liquid, it will be withdrawn from the very bottom of the tower.

The solvent phase ordinarily will collect in the quiescent zone under the baffle 37 and can and will be removed by pipe 43. This is the manner in which actual operation with toluene has been effected.

In any event the removed used solvent in passing through the activated charcoal or its functional equivalent is cleaned up, as it were, of the contained polymers and polymer formers and is reusable for additional cycles of use by being passed by 45 to solvent storage 46.

The weak caustic is returned by 47, pump 48, 49 and heater 50 to 27 and thence to the tower for reuse.

Make-up caustic can be added as desired and in the embodiment of the drawing is added to the strong caustic at 51.

The solvent injected will be one possessing an optimum of properties. Solvency and resistance to being entrained by the gases are properties to be considered. Thus, a lower vapor pressure solvent is normally preferred over one having a higher vapor pressure. For example, xylenes which have a boiling point higher than toluene are less subject to being entrained or vaporized into and carried overhead by the gases. However, one skilled in the art can, by mere routine test, determine which solvent or solvents will be most efficacious or optimum as the case may be for his particular use.

About 2–30 percent solvent by volume of circulating caustic wash are used on an intermittent basis for the operation as herein described.

Again referring to the drawing, a 32 tray column is used to treat about 80,000 pounds per hour of gas entering at about 100° F. and leaving the column at about 101°–105° F. The amount of solvent per injection is about 10–20 standard barrels per injection. The flows of water, strong caustic, NaOH, and weak caustic, NaOH, are as follows: 50, 150 and 75 gallons per minute, respectively.

In a specific operation, as here described, a reformed naphtha (Platformate) consisting essentially of about 40 percent toluene and about 25 percent xylenes has been used satisfactorily.

The activated carbon or charcoal as well as the bi-weekly batches of solvent can be and are dumped. Reclaiming, which can be practiced, is not now economically done.

It is an advantage that only small amounts of solvent and of charcoal are needed when operating according to the invention, which keeps at a reduced minimum the formation of polymer, especially when using the charcoal treatment step thereof.

The following data which have been obtained and have been used as a basis for the invention are of interest to one skilled in the art.

|  | gm Polymer Removed per 100 gm Dessicant | % of Polymer Removed |
|---|---|---|
| Isopentane | 2.4 | 22.5 |
| Benzene | 6.0 | 40.5 |

% polymer removed calculated $= 100 (C_1 - C_2)/C_1$
$C_1$ = carbon on original dessicant. $C_2$ = % carbon on extracted dessicant.

Reasonable variation and modification are possible within the scope of the foregoing disclosure, drawing and the appended claims to the invention the essence of which is that polymers and polymer-forming constituents are removed from a caustic wash solution used to treat a cracked gas containing ethylene by treating the same with a solvent and further, that the solvent can be treated to remove polymers and polymer-forming constituents therefrom by contacting the same with a treating agent, for example, activated charcoal, substantially as herein set forth and described.

We claim:

1. A method for treating a used circulating aqueous alkali wash liquid containing solid polymers formed from unsaturated hydrocarbon and polymer-forming unsaturated hydrocarbon constituents resulting in said liquid when used to wash a gas effluent resulting from the pyrolytic conversion of a normally gaseous hydrocarbon containing virtually no sulfur at a temperature of the order of 1,500–1,550° F. to form another gaseous unsaturated hydrocarbon virtually free from sulfur but containing polymer-forming unsaturated hydrocarbons including butylene and butadiene which comprises intimately contacting said used circulating liquid with a normally liquid hydrocarbon solvent by injecting the same into said circulating liquid so that it will remove therefrom said solid polymer and said polymer-forming constituents so that upon reuse of said liquid formation of additional polymer therein by said polymer-forming constituents will be avoided, thus to avoid plugging of pumps, pipes, etc., and separating the thus used solvent from said thus treated wash liquid.

2. A method according to claim 1 wherein the normally gaseous hydrocarbon is at least one of ethane and propane, the unsaturated hydrocarbon is ethylene and the solvent is at least one of an aromatic normally liquid hydrocarbon solvent and a saturated normally liquid hydrocarbon.

3. A method according to claim 2 wherein said solvent is at least one selected from isopentane, benzene, toluene and xylenes.

4. A method according to claim 1 wherein the used solvent containing polymer and polymer-forming constituents is contacted with an activated charcoal treating agent to remove from said used solvent polymer and polymer-forming constituents so that the formation of additional polymer in the wash operation by said polymer-forming constituents upon reuse of said wash fluid and/or said solvent will be avoided.

5. A method for treating a used circulating aqueous alkali wash liquid containing solid polymers formed from unsaturated hydrocarbon and polymer-forming unsaturated hydrocarbon constituents resulting in said liquid when used to wash a gas effluent resulting from the pyrolytic conversion of a normally gaseous hydrocarbon containing virtually no sulfur at a temperature of the order of 1,500° F. to form another gaseous unsaturated hydrocarbon virtually free from sulfur but containing polymer-forming unsaturated hydrocarbons including butylene and butadiene which comprises intimately contacting said used circulating liquid with a normally liquid hydrocarbon solvent by injecting the same into said circulating liquid so that it will remove therefrom said solid polymer and said polymer-forming constituents so that upon reuse of said liquid formation of additional polymer therein by said polymer-forming constituents will be avoided, thus to avoid plugging of pumps, pipes, etc., and separating the thus used solvent from said thus treated wash liquid.

* * * * *